Patented Jan. 3, 1950

2,493,274

UNITED STATES PATENT OFFICE 2,493,274

PRODUCTION OF RIBOFLAVIN BY FERMENTATION PROCESS

Benjamin Tabenkin, Nutley, N. J., assignor to Hoffmann-La Roche Inc., Nutley, N. J., a corporation of New Jersey No Drawing. Application July 16, 1947, Serial No. 761,445

2 Claims. (Cl. 195—35)

The present invention relates to the biochemical production of riboflavin. More particularly, this invention is concerned with a new method for producing riboflavin by the employment of a fungus known as *Eremothecium ashbyii* in a new type of nutrient or culture medium.

Heretofore, media employed for the cultivation of this fungus to produce riboflavin have all required the use of organic or proteinaceous nitrogen. Thus in Rudert Patent No. 2,374,503, a mash is employed which includes lipids and from 10 to 90 per cent of a proteinaceous material, based on the total nutrients in the medium, the mash being substantially carbohydrate free. In the Patent to Piersma, No. 2,400,710, animal protein material, a carbohydrate and a malt extract are required in the media in which the *Eremothecium ashbyii* organism is grown. Various animal proteinaceous materials such as liver, pancreas, spleen, lung, kidney and substances such as tankage, fish meal, dried blood, serum residues and the like are employed.

An undesirable characteristic of the media heretofore employed, all of which require added protein, is that the media have a tendency to froth or foam. Furthermore, the media present difficulties in handling and purification. The odor characteristics of the media are also unpleasant and undesirable in the handling thereof. Difficulty is met with in producing a standardized medium with predictable results in each case and a standard production of riboflavin.

Contrary to prior procedures requiring proteinaceous nitrogen, I have found that riboflavin can be obtained in large yields by subjecting a substantially protein-free aqueous culture medium to the action of *Eremothecium ashbyii* while aerating and agitating the medium. I have found that by employing ammonium nitrogen, an assimilable carbon source such as a carbohydrate as, for instance, sucrose or invert sugar, mineral nutrients and trace elements, inositol, and a buffer to maintain the pH within the optimum yield-producing range, commercially practical yields of riboflavin are readily obtained in a brief fermentation period.

While the addition of inositol is not absolutely essential, I have found that the presence thereof greatly enhances the yield of riboflavin.

Another feature of my new method of producing riboflavin and new culture medium employed in the process is that the objectionable frothing heretofore encountered in the known media is overcome and that the new medium makes a clean, easily-handled solution from which the riboflavin can be obtained in highly pure form after fermentation.

I designate my new medium as a synthetic medium, since aside from the presence of the carbon nutrient and the inositol, it is made up only of inorganic substances.

The following examples will serve to illustrate my invention:

Example 1

A culture medium is made up of the following ingredients:

| Component: | Gms. per liter of medium |
|---|---|
| Sucrose | 50 |
| Ammonium acid phosphate | 3 |
| Calcium carbonate | 5 |
| Potassium acid phosphate | 2 |
| Magnesium sulfate.7 $H_2O$ | .5 |
| Ferrous sulfate.7 $H_2O$ | .2 |
| Zinc sulfate.7 $H_2O$ | .04 |
| Copper sulfate.5 $H_2O$ | .005 |
| Water to make one liter. | |

Example 2

A culture medium is made up of the following ingredients:

| Component: | Gms. per liter of medium |
|---|---|
| Sucrose | 50 |
| Ammonium acid phosphate | 3 |
| Calcium carbonate | 5 |
| Potassium acid phosphate | 2 |
| Magnesium sulfate.7 $H_2O$ | .5 |
| Ferrous sulfate.7 $H_2O$ | .2 |
| Zinc sulfate.7 $H_2O$ | .04 |
| Copper sulfate.5 $H_2O$ | .005 |
| Inositol | .05 |
| Water to make one liter. | |

In carrying out my process, the above-mentioned media are inoculated with four per cent by volume of a suspension in water of a two day old growth of *Eremothecium ashbyii*. The inoculated medium is vigorously agitated and aerated. This can be accomplished in any suitable manner, as by carrying out the process in a reaction vessel provided with an agitator and with means for introducing sterile air into the liquid medium while it is being agitated. The optimum temperature for carrying out the process is about 28 to 30° C. At this temperature the fermentation was completed with the medium of Example 1 in 120 hours yielding a liquor containing 571 γ's per ml. of riboflavin. The fermentation with the medium of Example 2 was completed in about 144 hours and yielded a liquor containing 714 γ's per ml. of riboflavin.

When the production of riboflavin has reached a maximum, the fermentation is stopped and the mixture of mold and nutrient medium is brought to an acid concentration of about 0.25 N by the addition of concentrated sulfuric acid. The acidified solution is then heated for 20 minutes at about 120° C. to release all the riboflavin from the mold and to effect the complete solution of all the riboflavin in the fermentation mixture. The resulting liquid can then be worked up in any well known manner to recover the riboflavin.

If desired, the fermented medium may be evaporated to a riboflavin-rich solid and the latter mixed with various feeds and foodstuffs to fortify them with riboflavin and the other vitamins contained in the fermented medium.

The ammonium acid phosphate employed in the above examples is the source of ammonium nitrogen. It is to be understood, however, that other ammonium nitrogen sources may be employed such as ammonium nitrate, ammonium chloride, ammonium sulfate and the like. The ammonium nitrogen can be employed in the range of about 0.025 to 1 per cent of $NH_3$, the preferred amount being about 0.06 per cent of $NH_3$. Nitrogen in the form of nitrate or nitrite nitrogen is not effective.

Instead of employing sucrose in the synthetic media, there may also be employed as an assimilable carbon nutrient for the fungus, invert sugar, levulose, mannose, mannitol, glucose, glycerol, sorbitol, maltose and various other assimilable carbohydrates. The carbon nutrient can be employed in a range of about 2 to 10 per cent, the preferred amount being about 5 per cent.

The magnesium sulfate, ferrous sulfate, potassium acid phosphate, zinc sulfate and copper sulfate are employed as trace elements or mineral nutrients. The concentration of these salts may be varied over wide limits and it is to be understood that any other mineral salts which are assimilable by the organism and which provide magnesium, iron, zinc, copper, phosphorous and sulfur may be employed.

The calcium carbonate serves as a buffer maintaining the pH of the solution within the desired range. The pH may vary from about 4.0–7.5, although I prefer to employ a pH of 5.5–6.0. Instead of employing calcium carbonate to neutralize and buffer the fermentation media, other alkalies such as magnesium oxide and other biologically inert carbonates and oxides can be employed. The pH may likewise be maintained by constant neutralization of the acids formed during the fermentation by employing a soluble alkali, as sodium carbonate, potassium carbonate, sodium hydroxide, potassium hydroxide, and the like.

The inositol can be employed in a range of about 0.0005 to 0.005 per cent.

It will be understood that the fermentation is to be carried out under the usual sterile conditions since the presence of other organisms might result in lower yields and prevent the biochemical action which results in the production of riboflavin.

It will also be understood that the above examples are given for the purposes of illustration and that variations which come within the spirit of the invention are also intended to be covered by the appended claims.

The expressions "proteinaceous material" and/or "protein" as employed in the specification and claims is intended to include proteins and denatured or degraded proteins.

I claim:

1. A process of preparing riboflavin which comprises cultivating Eremothecium ashbyii in an aqueous liquid culture medium, containing assimilable carbon, assimilable phosphorus, assimilable sulfur, assimilable zinc, assimilable potassium and assimilable nitrogen, the sole source of nitrogen being ammonium nitrogen, while maintaining the pH at about 4.0–7.5.

2. A process of preparing riboflavin which comprises cultivating Eremothecium ashbyii in an aqueous liquid culture medium containing inositol, assimilable carbon, assimilable phosphorus, assimilable sulfur, assimilable zinc, assimilable potassium and assimilable nitrogen, the sole source of nitrogen being ammonium nitrogen, while maintaining the pH at about 4.0–7.5.

BENJAMIN TABENKIN.

REFERENCES CITED

The following references are of record in the file of this patent:

UNITED STATES PATENTS

| Number | Name | Date |
|---|---|---|
| 2,363,227 | Burkholder | Nov. 21, 1944 |
| 2,374,503 | Rudert | May 24, 1945 |
| 2,400,710 | Piersma | May 21, 1946 |
| 2,424,003 | Tanner | July 15, 1947 |

FOREIGN PATENTS

| Number | Country | Date |
|---|---|---|
| 593,953 | Great Britain | Oct. 30, 1947 |
| 913,165 | France | Aug. 30, 1946 |

OTHER REFERENCES

Schapfer, Helvetica Chimica Acta V, XXVII, published August 1, 1944, pp. 1017 to 1032. Pages 10, 19 relied upon.

Raffy, Comptes Rendus, Tome 205 (1937), pp. 1005, 1006.

Smith, Industrial Mycology, 2 ed. (1942), Edward Arnold and Co. Ltd., London, pages 171, 172, 173.

Buchanan, Agricultural and Industrial Bacteriology (1930), D. Appleton & Co., New York, pages 75 to 77, 83.